US009800095B2

(12) United States Patent
Rowe et al.

(10) Patent No.: US 9,800,095 B2
(45) Date of Patent: Oct. 24, 2017

(54) CORE SHELL SUPERPARAMAGNETIC IRON COBALT ALLOY NANOPARTICLES WITH FUNCTIONAL METAL SILICATE CORE SHELL INTERFACE AND A MAGNETIC CORE CONTAINING THE NANOPARTICLES

(71) Applicant: Toyota Motor Engineering & Manufacturing North America, Inc., Erlanger, KY (US)

(72) Inventors: Michael Paul Rowe, Pinckney, MI (US); Ryan Daniel Desautels, Winnipeg (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 864 days.

(21) Appl. No.: 14/252,036

(22) Filed: Apr. 14, 2014

(65) Prior Publication Data

US 2015/0294775 A1 Oct. 15, 2015

(51) Int. Cl.
*B60L 1/00* (2006.01)
*H02K 1/02* (2006.01)
*H01F 27/255* (2006.01)
*H01F 1/00* (2006.01)

(52) U.S. Cl.
CPC .............. *H02K 1/02* (2013.01); *H01F 1/0054* (2013.01); *H01F 27/255* (2013.01)

(58) Field of Classification Search
CPC ........ H02K 1/02; H01F 1/0054; H01F 27/255
See application file for complete search history.

(56) References Cited

U.S. PATENT DOCUMENTS

| 4,601,765 A | 7/1986 | Soileau et al. |
| 6,051,324 A | 4/2000 | Moorhead et al. |
| 6,808,807 B2 | 10/2004 | Anand et al. |
| 6,972,046 B2 | 12/2005 | Sun et al. |
| 2003/0077448 A1 | 4/2003 | Ueta et al. |
| 2010/0054981 A1 | 3/2010 | Liu |
| 2011/0104476 A1 | 5/2011 | Toyoda et al. |
| 2012/0106111 A1 | 5/2012 | Mazzochette et al. |
| 2013/0342069 A1 | 12/2013 | Rowe |
| 2014/0027667 A1 | 1/2014 | Rowe |

(Continued)

FOREIGN PATENT DOCUMENTS

JP 3153838 A 7/1991

OTHER PUBLICATIONS

U.S. Appl. No. 13/942,116, filed Jul. 15, 2013, Rowe, et al.

(Continued)

*Primary Examiner* — Daniel Cavallari
(74) *Attorney, Agent, or Firm* — Oblon, McClelland, Maier & Neustadt, L.L.P.

(57) ABSTRACT

Core shell nanoparticles of an iron-cobalt alloy core, a silicon dioxide shell and a metal silicate interface between the core and the shell are provided. The magnetic properties of the nanoparticles are tunable by control of the interface thickness. A magnetic core of high magnetic moment obtained by compression sintering the thermally annealed superparamagnetic core shell nanoparticles is also provided. The magnetic core has little core loss due to hysteresis or eddy current flow.

16 Claims, 7 Drawing Sheets (56) References Cited

U.S. PATENT DOCUMENTS

2014/0035713 A1 2/2014 Rowe
2015/0014573 A1* 1/2015 Rowe .................. B22F 1/0018
            252/62.55

OTHER PUBLICATIONS

U.S. Appl. No. 13/921,878, filed Jun. 19, 2013, Rowe.
U.S. Appl. No. 13/900,860, filed May 23, 2013, Rowe.
U.S. Appl. No. 14/270,619, filed May 6, 2014, Rowe, et al.
U.S. Appl. No. 14/270,752, filed May 6, 2014, Rowe, et al.
U.S. Appl. No. 14/296,917, filed Jun. 5, 2014, Rowe, et al.
Chih Hao Yu, et al., "Immobilization of BSA on Silica-Coated Magnetic Iron Oxide Nanoparticle" J. Phys. Chem. C, vol. 113, No. 2, (p. 537-543), 2009.
H S Park, et al., "Synthesis of Silica-Coated Ferromagnetic Fine Powder by Heterocoagulation" J. Phys. Condens. Matter 20 (2008) 204105 (6 pg.).
Shouheng Sun, et al., "Size-Controlled Synthesis of Magnetite Nanoparticles" J. Am. Chem. Soc., vol. 124, No. 28, (p. 8204-8205), 2002.
A Bumb, et al., "Synthesis and Characterization of Ultra-Small Superparamagnetic Iron Oxide Nanoparticles Thinly Coated with Silica" Nanotechnology 19 (2008) 335601 (6 pg.).
Ming Zhang, et al., "Synthesis and Characterization of Monodisperse Ultra-Thin Salica-Coated Magnetic Nanoparticles" Nanotechnology 19 (2008) 085601 (5 pg.).
U.S. Appl. No. 14/521,063, filed Oct. 22, 2014, Rowe, et al.

* cited by examiner

CORE SHELL SUPERPARAMAGNETIC IRON COBALT ALLOY NANOPARTICLES WITH FUNCTIONAL METAL SILICATE CORE SHELL INTERFACE AND A MAGNETIC CORE CONTAINING THE NANOPARTICLES

BACKGROUND OF THE INVENTION

Field of the Invention

The present invention relates to superparamagnetic core shell nanoparticles having an iron cobalt alloy core, a silica shell and a metal silicate interface layer between the alloy core and silica shell and a magnetic core produced with these nanoparticles. The core of the present invention is suitable for utility in power generation parts such as stators, rotors, armatures and actuators or any device whose function is dependent upon an efficient magnetic core, i.e., a magnetic core having a high magnetic moment, minimal magnetic hysteresis and no or little eddy current formation.

Discussion of the Background

Many electronic devices rely on magnetic cores as a method of transferring a magnetic field. Due to inefficiency caused by core loss, a portion of this power is lost, typically as waste heat. A core's magnetic properties have the ability to greatly concentrate and enhance magnetic fields. Thus, improving and implementing core materials with low loss as well as high magnetic permeability would enormously enhance the efficiency of the device. With increased interest in environmentally-conscious devices, the implementation of improved magnetic core material across millions and millions of devices that require them (all computers, TVs, cell phones, vehicle power electronics, etc.) could produce significant benefits for global energy conservation.

Magnetic materials generally fall into two classes which are designated as magnetically hard substances which may be permanently magnetized or soft magnetic materials which may be reversed in magnetism at low applied fields. It is important in soft magnetic materials that energy loss, normally referenced as "core loss" is kept to a minimum whereas in hard magnetic materials it is preferred to resist changes in magnetization. High core losses are therefore characteristic of permanent magnetic materials and are undesirable in soft magnetic materials.

The use of powdered magnetic materials allows the manufacture of magnetic parts having a wide variety of shapes and sizes. However, materials made from consolidated powdered magnetic materials have been limited to utility in applications involving direct currents. Direct current applications, unlike alternating current applications, do not require that the magnetic particles be insulated from one another in order to reduce eddy currents.

Conventionally, magnetic device parts are constructed from powders by compaction of the powders to a defined shape and then sintering the compact at temperatures of 600° C. or higher. Sintering the part following compaction, is necessary to achieve satisfactory mechanical properties in the part by providing particle to particle bonding and hence strength. However, sintering may cause volume changes and results in a manufacturing process with poor dimensional control.

In other processes designed to prepare parts having minimum eddy current losses, the magnetic particles are coated with thermoplastic materials before pressing. The plastic is provided to act as a barrier between the particles to reduce induced eddy current losses. However, in addition to the relatively high cost of such coatings, the plastic has poor mechanical strength and as a result, parts made using plastic-coated particles have relatively low mechanical strength. Additionally, many of these plastic-coated powders require a high level of binder when pressed. This results in decreased density of the pressed core part and, consequently, a decrease in magnetic permeability and lower induction. Additionally, and significantly, such plastic coatings typically degrade at temperatures of 150-200° C. Accordingly, magnetic parts made in such manner are generally limited to utility in low stress applications for which dimensional control is not critical.

Soft magnetic core components are frequently used in electrical/magnetic conversion devices such as motors, generators and transformers and alternators, particularly those found in automobile engines. The most important characteristics of soft magnetic core components are their maximum induction, magnetic permeability, and core loss characteristics. When a magnetic material is exposed to a rapidly varying magnetic field, a resultant energy loss in the core material occurs. These core losses are commonly divided into two principle contributing phenomena: hysteresis and eddy current losses. Hysteresis loss results from the expenditure of energy to overcome the retained magnetic forces within the core component. Eddy current loss, the other source of core loss, refers to circular currents setup within the magnetic core due to the applied magnetic field, as explained by Faraday's Law. Eddy current losses are brought about by the production of induced currents in the core component due to the changing flux caused by alternating current (AC) conditions. These circular currents create a magnetic field anti-parallel to the applied field, decreasing the overall field within the core. In order to reduce eddy current formation, materials with low electrical conductivities are used.

Magnetic core inefficiency is measured in terms of core loss. To improve core loss, the magnetic core must demonstrate a reduced measure of magnetic hysteresis as well as lowered eddy current formation.

Another important magnetic property of materials for soft magnetic components is the magnetic saturation ($M_s$) of the material. Magnetic saturation is empirically measured and is representative of the total magnetic moment of a material sample. A low $M_s$ can limit the application utility of a material and therefore, a high $M_s$ is an important property to be an effective and useful magnetic material.

The magnetic saturation is influenced by a number of factors, which includes material composition, crystallinity and the stress-strain exerted on the material during production.

Applicants have described a magnetic core of significantly reduced magnetic hysteresis and low eddy current formation obtained by sintering superparamagnetic core shell nanoparticles having an iron cobalt ternary alloy core and silica shell into a monolithic core structure in U.S. application Ser. No. 13/565,250, filed Aug. 8, 2012, the disclosure of which is incorporated herein by reference in its entirety.

These nanoparticles, while offering exceptionally low to zero coercivities ($H_C$), typically have decreased magnetic saturations ($M_S$). One possible reason for this lower magnetic saturation is canted spin alignment due to defects near the surfaces of these nanoparticles. It is believed that defects near the surface (be they crystalline or spin orientation defects) become kinetically trapped during the synthesis of the nanoparticles. Such atomic scale disorder lowers the $M_S$ and limits the maximum magnetic flux capacity of a magnetic device such as an inductor. To overcome this effect Applicants discovered that thermal treatment of a core shell nanoparticle having an iron cobalt alloy core resulted in a material having improved minimal core loss and high magnetic saturation. This invention is described in U.S. application Ser. No. 13/942,116, filed Jul. 15, 2013, the disclosure of which is incorporated herein by reference in its entirety.

However, there remains a need for magnetic powders having controllable or tunable magnetic properties which allow for production of tailored soft magnetic parts, having green strength, high temperature tolerance, and good mechanical properties, which provide parts having minimal or essentially no core loss and high magnetic moment.

Conventionally, ferromagnetic powders have been employed for the production of soft magnetic core devices. Such powders are generally in a size range measured in microns and are obtained by a mechanical milling diminution of a bulk material. Superparamagnetic nanoparticle materials having particle size of less than 100 nm have found utility for magnetic record imaging, as probes for medical imaging and have been applied for targeted delivery of therapeutic agents. However, the utilization of superparamagnetic powders of nanoparticles for production of core magnetic parts has until now, been limited.

Mazzochette et al. (U.S. 2012/0106111) describes anisotropic conductive adhesive films for application as a mechanical, electrical or thermal connection between electrical components. Magnetic nanoparticles are dispersed in a resin binder, aligned in columns under the influence of a magnetic field and the resin cured to fix the aligned particular columns.

Liu (U.S. 2010/0054981) describes a bulk nanocomposite permanent magnet having a combination of hard phases and soft phases intermixed. CoFe is included as an example of a soft magnetic alloy. Synthesis of FePt nanoparticles is described and coating of the FePt nanoparticle with $Fe_3O_4$ is also described. However, no core shell structures of a soft phase particle coated with an insulative silica shell is disclosed or suggested.

Bumb et al. (Nanotechnology, 19, 2008, 335601) describes synthesis of superparamagnetic iron oxide nanoparticles of 10-40 nm encapsulated in a silica coating layer of approximately 2 nm. Utility in power transformers is referenced, but no description of preparation of core structures is provided. "Tuning" the magnetic properties of the particles by control of the thickness of metal silica interface is not disclosed or suggested.

Zhang et al. (Nanotechnology, 19, 2008, 085601) describes synthesis of silica coated iron oxide particles. The average size of the iron oxide particle to be coated is 8 to 10 nm and the silica core is about 2 nm. "Tuning" the magnetic properties of the particles by control of the thickness of metal silica interface is not disclosed.

Park et al. (J. Phys. Condens. Matter. 20, 2008, 204105) describes the synthesis of core-shell nanoparticles (described as temperature-sensitive ferrite (TSF) covered with silica). The ferrite core (mean diameter of 10 nm) was prepared by coprecipitation in an alkaline solution. Then, silica coating was carried out by the controlled hydrolysis and condensation of tetraethyl orthosilicate (TEOS). The core-shell particles were formed by a surface precipitation procedure using TSF nanoparticles as a core material. The thickness of the silica layer on TSF cores was observed by means of transmission electron microscopy (TEM). However, "tuning" the magnetic properties of the particles by control of the thickness of a metal silicate interface is not disclosed.

Toyoda et al. (U.S. 2011/0104476) describe a soft magnetic material of iron or an iron alloy particle having a grain size of from 5 to 400 μm which is provided with an oxide insulative coating including silicon oxide. The coated particles are mixed with an organic substance which is a non-thermoplastic resin and at least one of a thermoplastic resin and a higher fatty acid. The content of the organic substance in the mixed material is from 0.001 to 0.2% by mass. The mixed material is compression molded and then subjected to a heat treatment at a temperature between the glass transition temperature and the thermal decomposition temperature of the non-thermoplastic resin. The molded and heat treated structure is indicated to be useful for electric and electronic components such as a motor core or a transformer core.

Moorhead et al. (U.S. Pat. No. 6,051,324) describes a composite obtained by compaction of coated metal particles. The metal particles are of approximately 325 mesh and include as metal materials, alloys of iron, cobalt, vanadium and chromium. The alloy particles are coated with an inorganic material such as a ceramic or glass. Examples of the coating material include $Al_2O_3$ and $SiO_2$. Adjustment of magnetic properties through control of the thickness of a metal silicate interface layer is neither disclosed nor suggested.

Ueta et al. (U.S. 2003/0077448) describes a ferromagnetic raw metal powder (primarily iron) having a coating of various oxide materials including silicon. Claim 1 provides a ferromagnetic powder which is surface coated with a silicone resin and a pigment. The coated particle has a diameter on the order of 100 microns. Warm pressing of the powder to produce a core is described as well as annealing of a core at elevated temperature.

Morikazu et al (JP03153838) (Abstract only) describes a sintered alloy molding which is obtained by surface treating a Fe/Co/V alloy powder with alkoxy silane type agent. Upon sintering, a Fe/Co/V/Si alloy is formed.

Soileau et al. (U.S. Pat. No. 4,601,765) describes a core obtained by compaction of iron powder which has been coated with an alkali metal silicate and then a silicone resin polymer. The iron particles to which the coating is applied have a mean particle size of 0.002 to 0.006 inches. The core is prepared by compaction of the powder at greater than 25 tons per square inch and then annealing the pressed component.

Yu et al. (J. Phys. Chem. C 2009, 113, 537-543) describes the preparation of magnetic iron oxide nanoparticles encapsulated in a silica shell. Utility of the particles as magnetic binding agents for proteins is studied.

Sun et al. (J. Am. Chem. Soc., 2002, 124, 8204-8205) describes a method to produce monodisperse magnetite nanoparticles which can be employed as seeds to grow larger nanoparticles of up to 20 nm in size.

Sun et al. (U.S. Pat. No. 6,972,046) describes a process of forming a hard-soft phase, exchange-coupled magnetic nanocomposite. According to the method solvent dispersions of hard phase nanoparticles and soft phase nanoparticles are mixed, and the solvent removed to obtain self-assembled structures. Coatings of the nanoparticles are removed in an annealing treatment to form a compact nanoparticle self-assembly wherein the nanoparticles are exchange coupled. The soft magnetic materials include Co, Fe, Ni, CoFe, NiFe, $Fe_2O_3$ and other oxides. The hard magnetic materials include CoPt, FePt, SmCo based alloys and rare earth-FeB-based alloys. The nanocomposites may be compacted to form a high density nanocomposite that is devoid of spaces between the magnetic materials in order to obtain a bulk permanent magnet.

None of the above references recognizes the significance of a metal silicate interface which is formed between the core and silica shell. None of these references disclose or suggest that core shell nanoparticles having an iron cobalt alloy core and silica shell with a metal silicate interface can be tuned with respect to magnetic properties by control of the thickness of the metal silicate layer. Likewise, none of the above references disclose or suggest a monolithic magnetic core constructed by heated compression of nanoparticular iron cobalt alloy encapsulated in a silica shell having a metal silicate interface layer of controlled thickness, wherein the particles are directly compacted without addition of lubricant or other material to facilitate particle adherence.

An object of the present invention is to provide a magnetic powder to produce soft magnetic parts, having in addition to increased green strength, high temperature tolerance, good mechanical properties, minimal or essentially no core loss and high magnetic saturation, a property of being tunable in terms of magnetic properties.

A second object of the invention is to provide a magnetic core having a high total magnetic moment and little or no core loss wherein the magnetic properties can be altered or controlled according to the tunable properties of the core shell nanoparticles.

A third object is to provide a method to produce a magnetic core or shaped core part having a high total magnetic moment and little or no core loss.

SUMMARY OF THE INVENTION

These and other objects have been achieved according to the present invention, the first embodiment of which includes a superparamagnetic core shell nanoparticle, comprising: a superparamagnetic core comprising an iron cobalt alloy; a shell of a silicon dioxide coating the core; and a metal silicate interface layer between the core and the silicon dioxide shell; wherein a diameter of the iron cobalt alloy core is 200 nm or less, the core shell particle is obtained by a process comprising: wet chemical precipitation of the core; coating of the core with a wet chemical silicate synthesis to form the silicon dioxide shell, and the thickness of the metal silicate interface is controlled by the time of the wet chemical synthesis.

In an aspect of the first embodiment, the metal silicate interface may be from 0.5 to 10 nm in thickness and the thickness may be controlled by length of time of the wet synthesis to prepare the silicon dioxide shell.

In a second embodiment, the present invention provides a magnetic core, comprising: a plurality of the superparamagnetic core shell nanoparticles according to the first embodiment; wherein the magnetic core is a monolithic structure of superparamagnetic core grains of an iron cobalt alloy directly bonded by the silicon dioxide shells, which form a silica matrix, and a layer comprising at least one of iron silicate and cobalt silicate interfaces the core to the matrix.

In a further embodiment, the present invention provides a method to prepare a monolithic magnetic core, the magnetic core comprising the superparamagnetic core shell particles of any of the previous embodiments.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Throughout this description all ranges described include all values and sub-ranges therein, unless otherwise specified.

Additionally, the indefinite article "a" or "an" carries the meaning of "one or more" throughout the description, unless otherwise specified.

The inventors have discovered that the formation of individual FeCo alloy nanoparticles coated with silica shells of various thicknesses may be achieved via a scalable wet chemical process. Surprisingly, the inventors have discovered that formation of interfacial metal silicates may alter significantly the nanomagnetism in these ultra-high surface area FeCo alloy nanoparticle systems. Evidence that an interfacial layer of metal silicates had formed was observed in x-ray photoelectron spectra collected over the 2p transitions of Fe and Co; and as the thickness of the silica shell was increased (by altering the duration of the silica reaction) a thicker interfacial metal silicate layer was formed, increasing the nanoparticles' overall magnetic anisotropy, as evidenced by increased blocking temperatures and altered coercivities. Thus the inventors have surprisingly discovered that by producing superparamagnetic iron cobalt alloy nanoparticles that are encapsulated in silica shells with varying degree of wet synthesis treatment time, core shell FeCo nanoparticles having differing nanomagnetic properties may be obtained. Compacting and sintering these nanoparticles with tuned magnetic properties into a monolithic nanomaterial provides a core having zero (or very low) hysteresis and very low eddy current formation.

Thus, the first embodiment of the present invention includes a superparamagnetic core shell nanoparticle, comprising: a superparamagnetic core of an iron cobalt alloy; a shell of a silicon dioxide coating the core; and a metal silicate interface layer between the core and the silicon dioxide shell; wherein a diameter of the iron cobalt alloy core is 200 nm or less, the core shell particle is obtained by a process comprising: wet chemical precipitation of the core; coating of the core with a wet chemical silicate synthesis to form the silicon dioxide shell, and the thickness of the metal silicate interface is controlled by the time of the wet chemical synthesis. In certain embodiments the diameter of the iron cobalt alloy nanoparticle core is 100 nm or less, and in further embodiments the diameter of the iron cobalt alloy nanoparticle core is from 2 nm to 50 nm.

According to the invention, the iron cobalt alloy nanoparticle grains are of or approaching the size of the single particle magnetic domain of the iron cobalt alloy and thus are superparamagnetic. While not being constrained to theory, the inventors believe control of grain size to approximately that of the particle magnetic domain is a factor which contributes to the reduced hysteresis of a magnetic core according to the present invention. Moreover, the presence of insulating silica shells about the core grains is a factor which contributes to the low eddy current formation of a magnetic core according to the present invention.

It is conventionally known that the range of particle size for which single domain particles exhibit superparamagnetism has an upper boundary characteristic of the particle chemical composition.

The inventors have discovered that during synthesis of the silicon dioxide shell a metal silicate thin layer interface is coincidently formed. Evidence that an interfacial layer of metal silicates had formed was observed in x-ray photoelectron spectra collected over the 2p transitions of Fe and Co; and as the thickness of the silica shell was increased (by altering the duration of the silica reaction) a thicker interfacial metal silicate layer was formed, increasing the nanoparticles' overall magnetic anisotropy, as evidenced by increased blocking temperatures and altered coercivities. The inventors have recognized that an understanding of the effect of this interfacial metal silicate layer to control magnetic properties is a key element to effective utility of these materials in applications as low-loss transformer cores.

In a study of the FeCo alloy core shell nanoparticles, the inventors have discovered that interfacial metal silicates formed during the silicon dioxide shell coating synthesis, alter the overall magnetic anisotropy of the nanoparticles as a higher anisotropy phase that is a combination of Fe- and Co-based silicates that acts to increase the 'magnetically active volume' of the nanoparticles compared to a bare FeCo nanoparticle.

Binary alloy FeCo single-magnetic-domain nanoparticle samples were synthesized (see Example), with the exception of varying the duration of the $SiO_2$ reaction times, which led to $SiO_2$ shells of varying thickness: a 1 min reaction time produced a 3 nm thick shell, 10 minutes a 4 nm thick shell, and 20 minutes a 6 nm thick shell. The average FeCo nanoparticle diameter and $SiO_2$ shell thickness were determined and for all three core/shell nanoparticle samples (FeCo/$SiO_2$(3 nm), FeCo/$SiO_2$(4 nm), and FeCo/$SiO_2$(6 nm)), the average FeCo core diameter was found to be 4±1 nm indicating a high degree of reproducibility in the nanoparticle core synthesis. The thicknesses of the silica shells were determined in a similar manner and found to be 3±1 nm, 4±1 nm, and 6±1 nm for the FeCo/$SiO_2$(3 nm), FeCo/$SiO_2$(4 nm), and FeCo/$SiO_2$(6 nm) samples, respectively. From the TEM images, it was observed that the FeCo cores were covered completely by the silica shells. Analysis of X-ray diffraction patterns indicated the presence of both Fe and Co silicates. However, the relative proportions appear to be variable and although not wishing to be constrained by theory, the inventors believe that metal silicate content may be related to the thermodynamic energy of formation of the metal silicate. The studies showed that Fe- and Co-silicates formed at the interface between the FeCo nanoparticle core and the $SiO_2$ shell during the synthesis process. However, the relative integrated areas of the $Fe^0$ and $Co^0$ metallic peaks of the different core/shell nanoparticle systems indicated Fe-silicates may be formed preferentially over Co-silicates.

Figure 5:
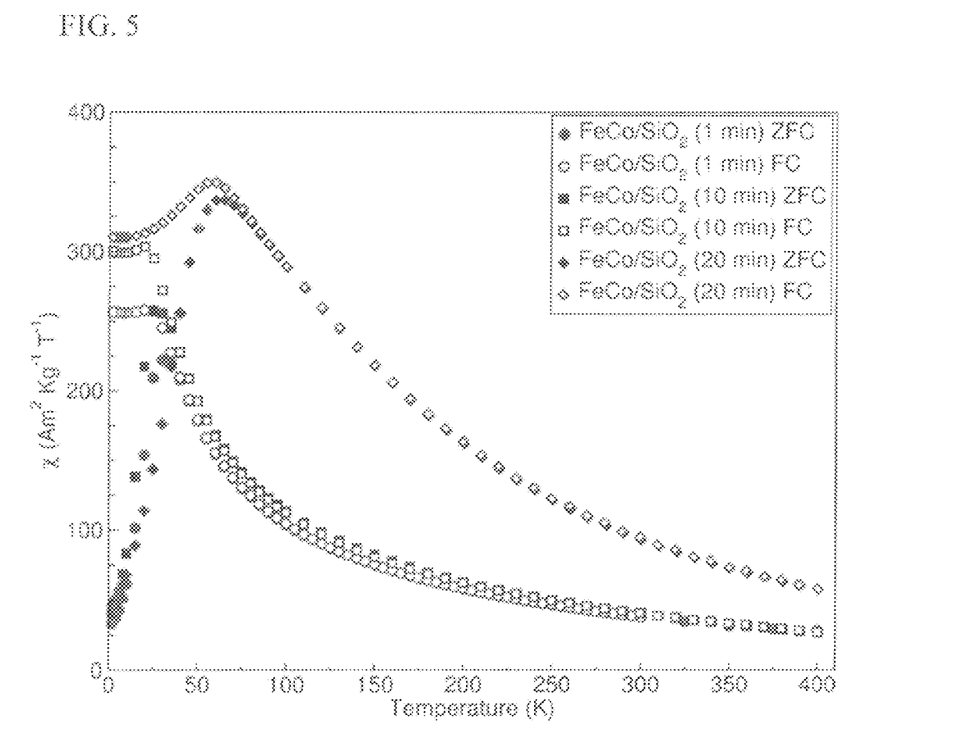
FIG. 5 shows Zero-field-cooled (ZFC) and field-cooled (FC) 5 mT DC susceptibility ($\chi$) scans as a function of temperature for the three $FeCo/SiO_2$ nanoparticle systems (3 nm, 4 nm and 6 nm).

To examine the effect of the metal silicate interface on the magnetic properties of the nanoparticles, the temperature dependence of the DC susceptibility, $\chi_{DC}(T)=M(T)/\mu_0H$, for the FeCo/$SiO_2$ nanoparticle samples was measured in both the zero-field-cooled (ZFC) and field-cooled (FC) configurations using an applied field of 5 mT, (FIG. 5). Initially, the samples were ZFC from 400 to 2 K, well above their superparamagnetic blocking temperature ($T_B$) to ensure that the nanoparticles' magnetizations were oriented randomly along their easy axis (set by the intrinsic magnetocrystalline anisotropy) so that no preferred orientation was set. As thermal energy was added to the system with warming from 2 K, a rapid increase in the overall susceptibility (their magnetizations underwent 180° orientation flips with respect to their intrinsic magnetocrystalline anisotropy axis; faster than the timescale of the measurement) and observed as a maximum in $\chi_{ZFC}(T)$. With further addition of thermal energy from warming, the remaining larger nanoparticles became superparamagnetic and a decrease in the measured magnetization was observed as the (time-averaged) measured susceptibility decreased. In general, for a non-interacting monodisperse single-domain nanoparticle $T_B$ is indicated by maximum in the $\chi_{ZFC}(T)$ that coincides with the divergence with $\chi_{FC}(T)$. Since the TEM images indicated a reasonably monodisperse system, with all FeCo nanoparticles in their $SiO_2$ shells having similar small size distributions, the observed differences in the $\chi_{ZFC}(T)$ and $\chi_{FC}(T)$ around a temperature which should nominally be a $T_B$ must be due to dipole-dipole interactions occurring between the nanoparticles. The maximum $\chi_{ZFC}(T)$ and $\chi_{FC}(T)$ temperature ($T_P$), is representative of the temperature where the dipole-dipole interaction energies are on par with that provide by the applied field to reorient the nanoparticle's magnetization at that temperature. The $T_B$'s for the nanoparticle samples were determined to be ~30 K, ~30 K, and ~43 K from the peaks in the $\chi_{ZFC}(T)$ for the FeCo/$SiO_2$(3 nm), FeCo/$SiO_2$(4 nm), and FeCo/$SiO_2$(6 nm) samples, respectively. These $T_B$'s are in good agreement with those determined from the temperature dependence of the coercivity. The observed increase in $T_B$ with silica shell thickness is an indication of an increased magnetic anisotropy due to the metal-silicate interfacial layer which altered the surface spin environment of the FeCo core nanoparticle. A reduction in surface spin disorder would increase the overall magnetic volume of the nanoparticle core (compared to a bare nanoparticle where the surface moments, a significant fraction of the overall magnetic moments, are disordered). Further evidence of the effects of the interactions between the interfacial metal silicate layer and the FeCo nanoparticle core were observed in the temperature dependence of the coercivity and frequency dependent AC susceptibility measurements.

Figure 6:
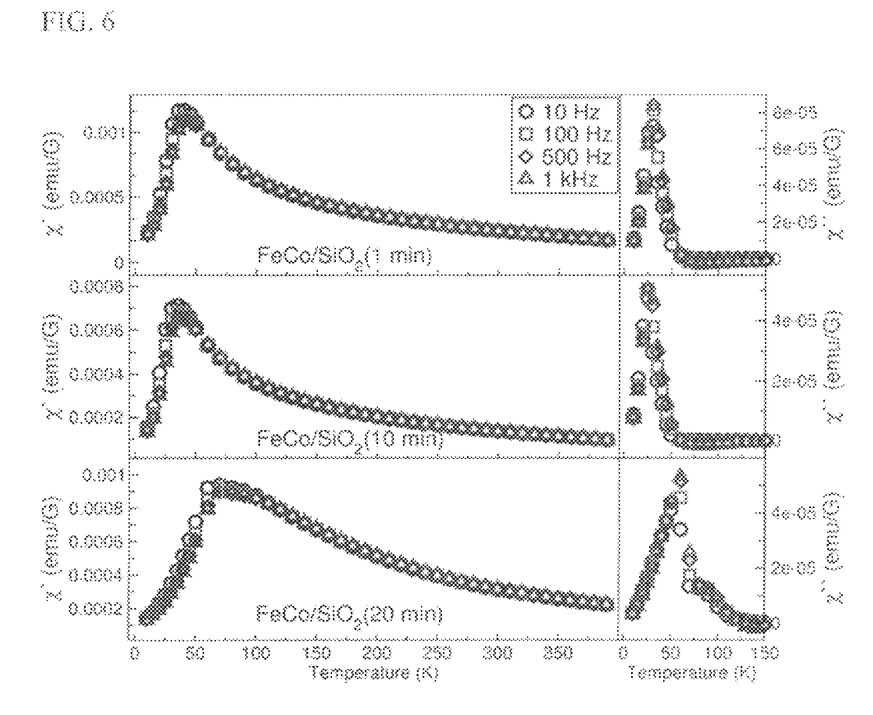
FIG. 6 shows AC susceptibility as a function of temperature and frequency for the three $FeCo/SiO_2$ nanoparticle samples (3 nm, 4 nm and 6 nm) collected at 10, 100, 500, and 1000 Hz.

The effects of the interfacial metal silicate layer on the overall magnetocrystalline anisotropy of the core/shell nanoparticles were determined by performing frequency dependent AC susceptibility measurements ($\chi_{AC}(T,\nu)$) using a 0.25 mT drive field at frequencies from 10 to 1000 Hz (FIG. 6). For example, the FeCo/$SiO_2$(3 nm) nanoparticle system, after ZFC down to 10 K, presented a gradual increase in $\chi_{AC}(T)$ with warming, from the increased thermal energy which enabled the single domain FeCo/SiO$_2$(3 nm) nanoparticle's magnetizations to oscillate with increasing rates. At $T_B$=30 K, the nanoparticle's magnetizations started to become superparamagnetic, undergoing 180° orientation flips. As the occurrence of these superparamagnetic fluctuations increased, with continued warming, the time-averaged nanoparticle magnetization decreased, resulting in the gradual reduction of $\chi_{AC}(T)$ along with no observable frequency independence as the fluctuations occurred beyond the measuring time window. For the FeCo/SiO$_2$(4 nm) and FeCo/SiO$_2$(6 nm) nanoparticle samples, similar trends in the temperature and frequency dependence of $\chi_{AC}(T,\nu)$ were observed and $T_B$'s of 30 and 43 K were determined. Describing the observed frequency dependence of $T_B$ from the in-phase $\chi'_{AC}(T,\nu)$ using the Vogel-Fulcher law enabled the nanoparticles overall magnetocrystalline anisotropies to be calculated. A value of $(6\pm1)\times10^5$ J/m$^3$, $(5\pm1)\times10^5$ J/m$^3$, and $(12\pm2)\times10^5$ J/m$^3$ were obtained for the FeCo/SiO$_2$(3 nm), FeCo/SiO$_2$(4 nm), and FeCo/SiO$_2$(6 nm) samples, respectively. As the thickness of the silica shells increased the overall magnetocrystalline anisotropy increased as well, indicating that the metal silicate interface layer significantly affected the surface spin environment of the FeCo core.

Figure 7:
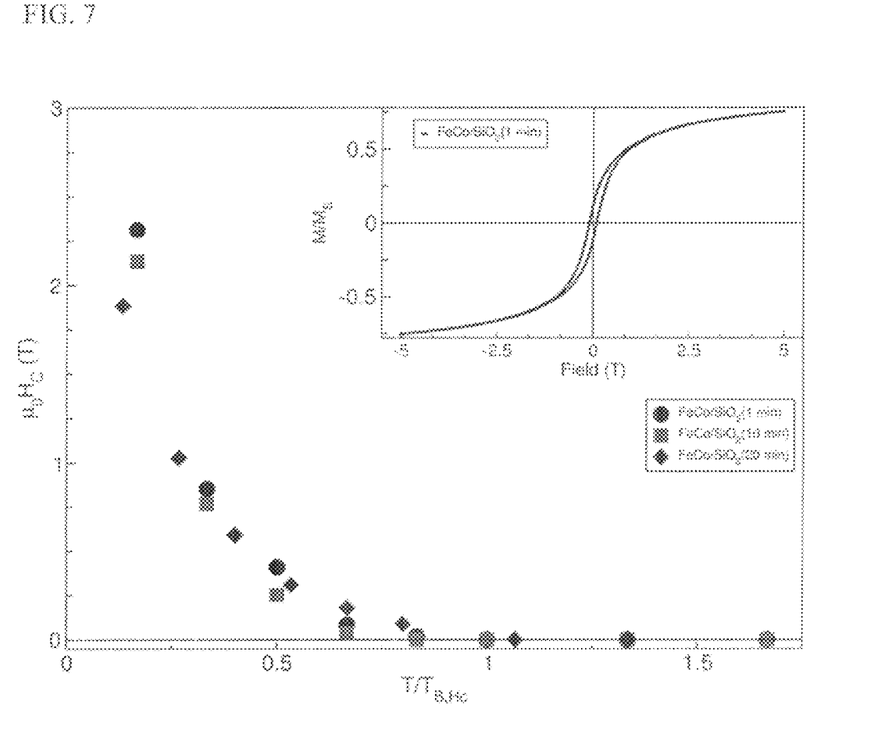
FIG. 7 shows the temperature dependence of coercivity of the $FeCo/SiO_2$ nanoparticles.

Hysteresis loops (inset of FIG. 7) were collected after the samples were initially field-cooled (FC) in 5 T from 300 K (a temperature above $T_B$) to 5 K. Field-cooling was done to establish whether even a monolayer of a Fe- or Co-oxide had formed around the FeCo nanoparticle core's that would result in a field shift from zero of the hysteresis loops—none was observed, indicating clearly that any oxidation had not occurred. It was determined that as the thickness of the silica shell was increased from 3 to 6 nm, the measured H$_C$ also increased. Although not wishing to be constrained by theory this behavior may be a result of the increased magnetic volume of the core as more interface Fe and Co atomic spins in the FeCo nanoparticles were recaptured to provide additional magnetic response. A similar increase was observed in the saturation magnetization measured at 5 K, where $M_S$=54.6±0.9 emu/g, 56.8±0.1 emu/g, and 65.8±0.2 emu/g for FeCo/SiO$_2$(3 nm), FeCo/SiO$_2$(4 nm), and FeCo/SiO$_2$(6 nm), respectively.

Nanoparticles of Fe—Co/SiO$_2$ may be synthesized by the ethanolic reaction of sodium borohydride with iron dichloride and cobalt dichloride in a solution of sodium hydroxide and tetraoctylammonium bromide. The obtained nanoparticles may be treated with tetraethyl orthosilicate, in water ethanol mixture using triethylamine as the base-catalyst, to form silica shells. These particles may then be purified using an aqueous ethanol rinse.

As indicated, the length of the treatment of the Fe—Co nanoparticles determines the width of the silicon dioxide coating and correspondingly, the width of the metal silicate layer. The longer the treatment time, the greater the amount of the coating and the greater the width of the metal silicate layer.

The synthesis may be conducted for such time as necessary to prepare a metal silicate layer of 0.5 to 20 nm, preferably 0.8 to 10 nm and most preferably 1.0 to 8 nm.

In another embodiment, the present invention includes a magnetic core, comprising: the thermally annealed iron-cobalt alloy core shell nanoparticles having a particle size of less than 200 nm, preferably less than 100 nm and most preferably from 2 to 50 nm; wherein the magnetic core is a monolithic structure of superparamagnetic core grains of an iron cobalt alloy directly bonded by the silicon dioxide shells, which form a silica matrix, and a layer comprising at least one of iron silicate and cobalt silicate interfaces the core to the matrix.

The core according to the present invention is monolithic, having the space between the iron-cobalt alloy nanoparticle grains occupied by the silicon dioxide. Preferably at least 97% of the space between the grains, preferably 98% and most preferably 99% of the space is silicon dioxide. According to the present invention neither any binder nor any resin is contained in the matrix of the monolithic core. The monolithic core according to the present invention is obtained by a process comprising sintering a powder of the superparamagnetic core shell particles having a particle size of less than 200 nm under pressure under flow of an inert gas to obtain a monolithic structure; wherein the core of the core/shell particle consists of superparamagnetic iron-cobalt alloy, and the shell consists of silicon dioxide. Because a magnetic material is only superparamagnetic when the grain size is near or below the magnetic domain size, the nanoparticle core must be maintained as small as possible, or the sample will become ferromagnetic, and express magnetic hysteresis. Therefore, the most mild and gentle sintering conditions that still yield a monolithic sample that is robust enough to be machined into a toroid are desired, because more aggressive sintering conditions will promote unwanted grain growth and potentially, loss of superparamagnetic performance.

The magnetic core as described herein may be employed as a component in an electrical/magnetic conversion device, as known to one of ordinary skill in the art. In particular the magnetic core according to the present invention may be a component of a vehicle part such as a motor, a generator, a transformer, an inductor and an alternator, where high magnetic moment is advantageous.

Having generally described this invention, a further understanding can be obtained by reference to certain specific examples which are provided herein for purposes of illustration only and are not intended to be limiting unless otherwise specified. Skilled artisans will recognize the utility of the devices of the present invention as a battery as well as the general utility of the electrolyte system described herein.

Example

Core/Shell Iron-Cobalt/Silica-Coated Nanoparticles

FeCo/silica core/shell nanoparticles were synthesized, in an inert argon atmosphere, as follows: FeCl$_2$.4H$_2$O (10.9229 g), CoCl$_2$.6H$_2$O (12.0466 g), trioctylammonia bromide (17.9006 g), and NaOH (0.4906 g) were dissolved in ethanol (250 mL). A solution of NaBH$_4$ (12.2580 g) in ethanol (450 mL) was added drop-wise. The product was then washed three times with a solution of 70% H$_2$O and 30% ethanol (500 mL) that had been bubbled with N$_2$ to remove dissolved O$_2$. A solution of triethylamine (2 mL) and H$_2$O (625 mL) bubbled with N$_2$ to remove dissolved O$_2$ was added to the FeCo nanoparticle suspension and allowed to mix fully. Tetraethyl orthosilicate (TEOS, 0.5 mL) in N$_2$ bubbled ethanol (390 mL) was added to this nanoparticle suspension, and stirred for 15 minutes. The silica-coated iron cobalt nanoparticles were collected from solution using a rare-earth magnet, and then washed with N$_2$ bubbled ethanol (500 mL) several times. The solution was then dried under vacuum for several hours.

Figure 1:
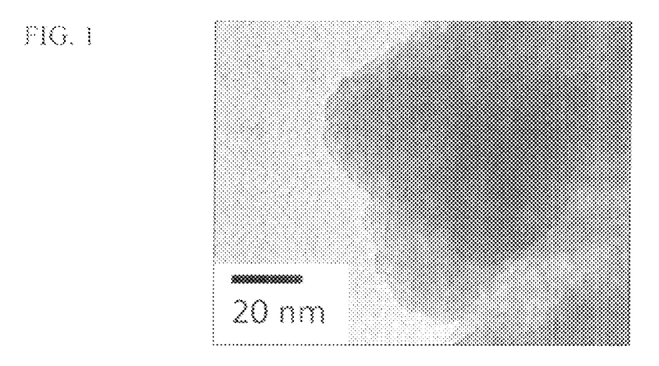
FIG. 1 shows a TEM image of the nanoparticles prepared in the Example.
Figure 3:
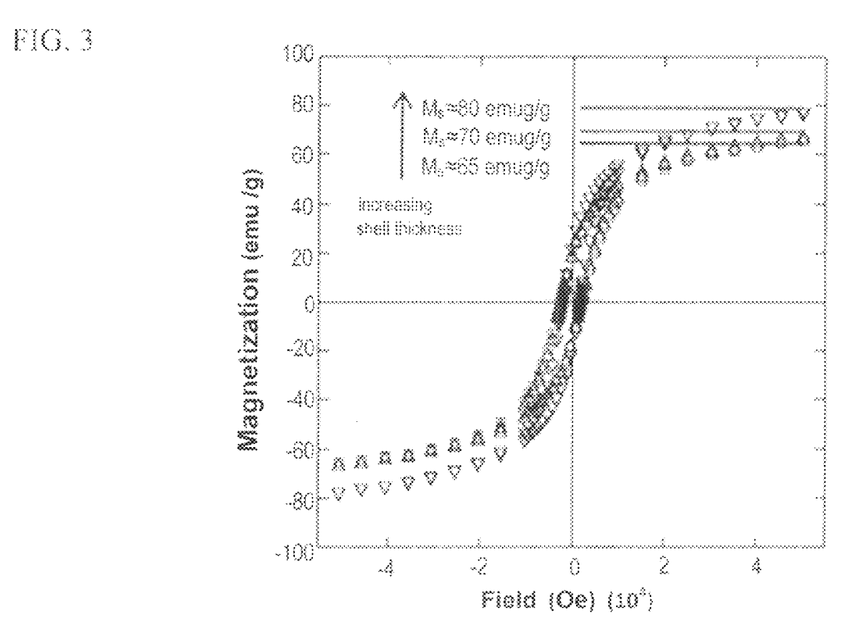
FIG. 3 shows the relationship of magnetic saturation with increase of $SiO_2$ shell thickness.
Figure 4A:
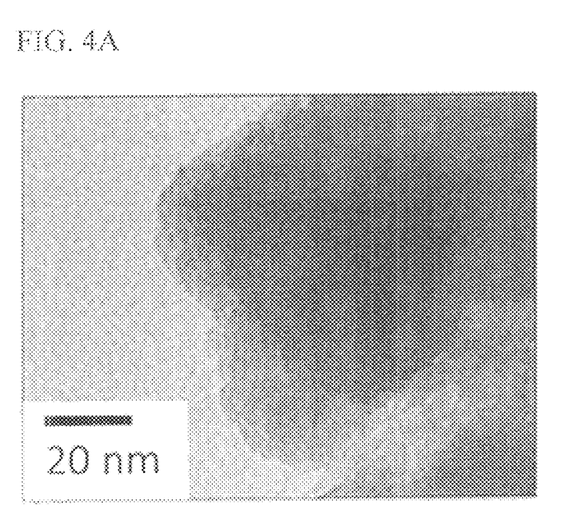
FIG. 4A shows a TEM image of $FeCo/SiO_2$ (3 nm) nanoparticles.
Figure 4B:
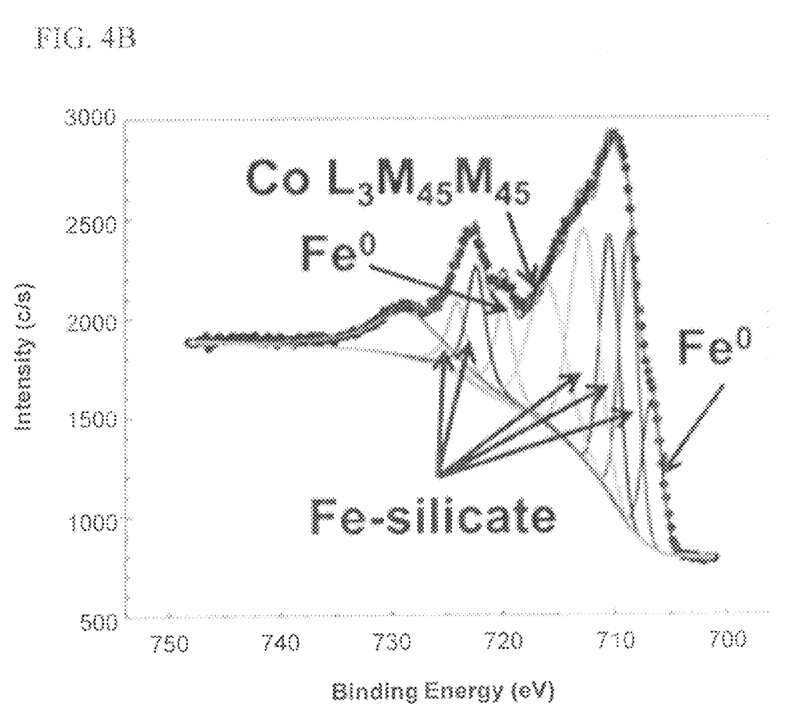
FIG. 4B shows a high resolution XPS scan over the Fe2p binding energies for $FeCo/SiO_2$ (3 nm) nanoparticles.
Figure 4C:
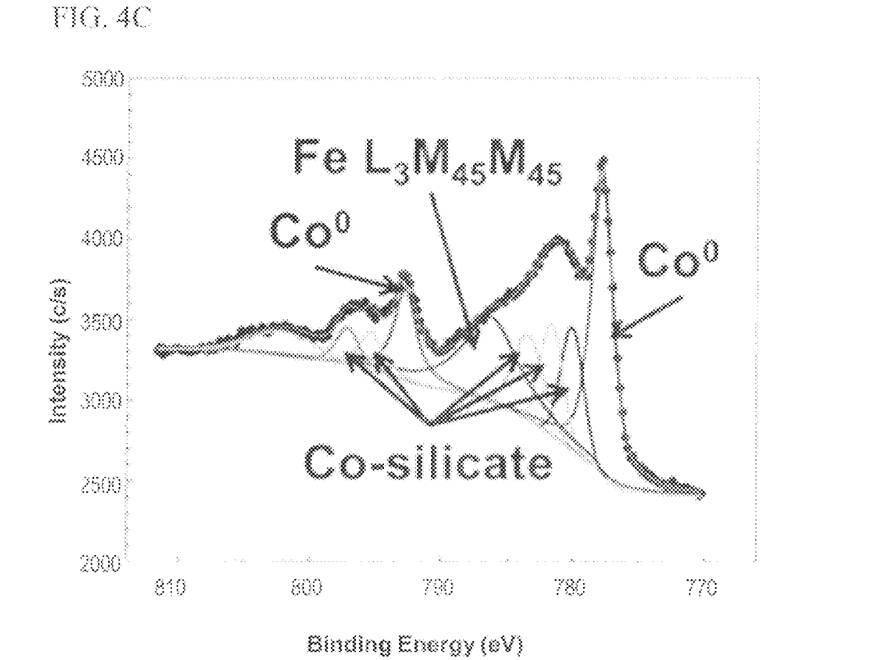
FIG. 4C shows a high resolution XPS scan over the Co2p binding energies for $FeCo/SiO_2$ (3 nm) nanoparticles.
Figure 4D:
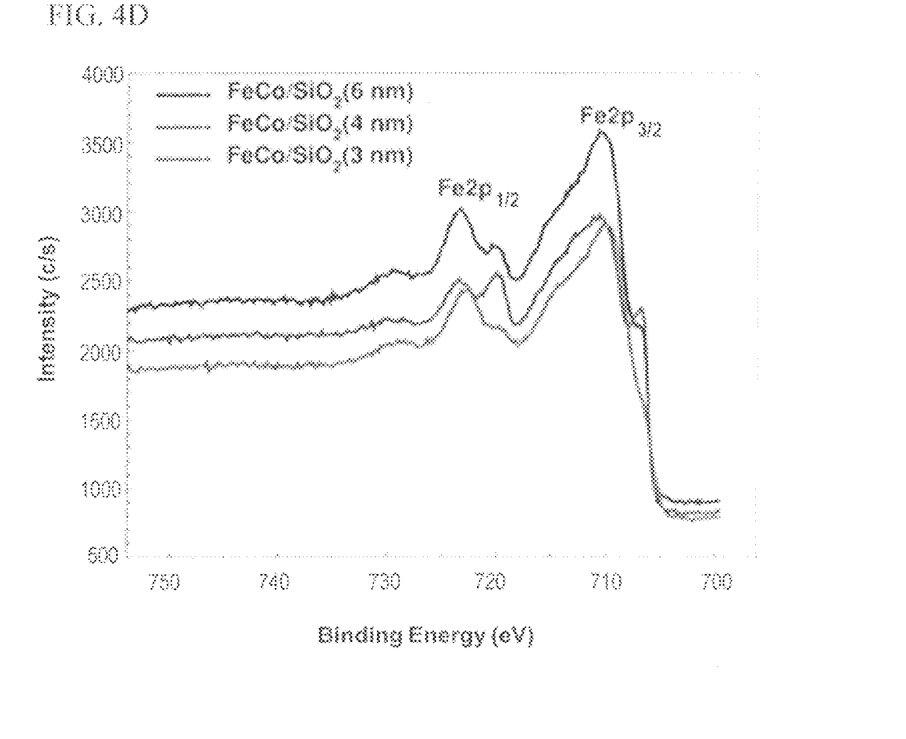
FIG. 4D shows a comparison of the Fe2p XPS scan with different $SiO_2$ thickness.

X-ray photoelectron spectroscopy experiments (FIG. 1) performed over the Si2p binding energies indicated the presence of metal silicate phases (e.g. Fe—SiO$_2$, Co—SiO$_2$, or [Fe,Co]—SiO$_2$). The metal silicate peak was located at a binding energy of 102.51 eV and a SiO$_2$ peak was located at 100.70 eV, in agreement with previously viewed nanoscale SiO$_2$ Transmission electron microscopy images (FIG. 3) showed clearly the core/shell nature of the nanoparticles. The FeCo of the nanoparticle cores were observed to remained apparently unchanged (4±1 nm in diameter) with the SiO$_2$ shell thickness increasing systematically with the TEOS reaction time (3±1 nm for a 1 minute reaction, 4±1 nm for a 10 minute reaction and 6±1 nm for a 20 minute reaction).

Figure 2:
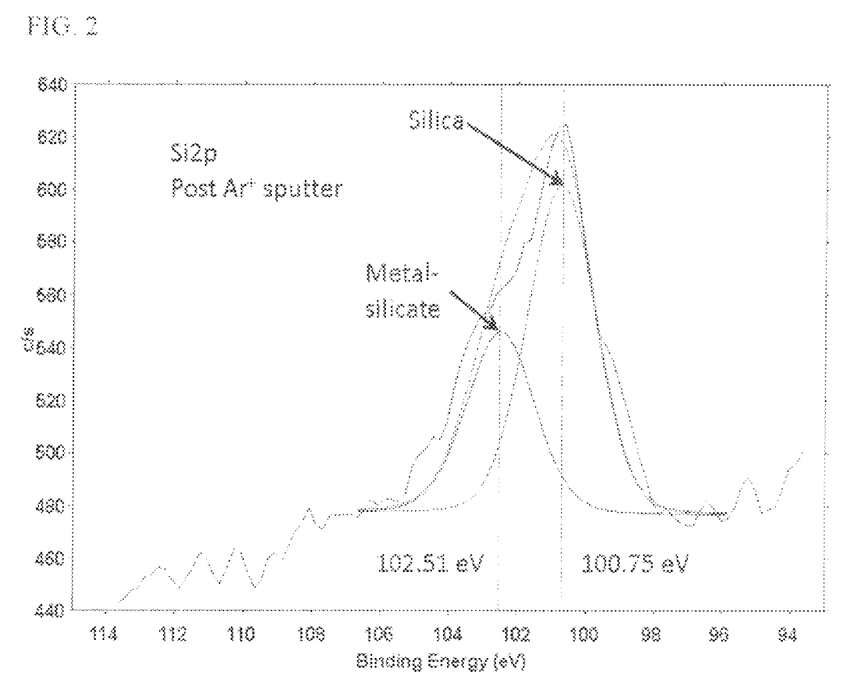
FIG. 2 shows a X-ray photoelectron spectroscopy performed over the Si2p binding energies for the nanoparticles prepared in the Example.

The average FeCo nanoparticle diameter and SiO$_2$ shell thickness were determined using ImageJ analysis of transmission electron microscopy (TEM) images (FIG. 2) collected using a Hitachi 9500 operating at 120 kV. For all three core/shell nanoparticle samples (FeCo/SiO$_2$(3 nm), FeCo/SiO$_2$(4 nm), and FeCo/SiO$_2$(6 nm)), the average FeCo core diameter was found to be 4±1 nm indicating a high degree of reproducibility in the nanoparticle core synthesis. The thicknesses of the silica shells were determined in a similar manner and found to be 3±1 nm, 4±1 nm, and 6±1 nm for the FeCo/SiO$_2$(3 nm), FeCo/SiO$_2$(4 nm), and FeCo/SiO$_2$(6 nm) samples, respectively. From the TEM images, it was observed that the FeCo cores were covered completely by the silica shells and formed agglomerations of core/shell nanoparticles. X-ray diffraction patterns collected using a Rigaku SmartLab x-ray diffractometer showed a broad amorphous reflections centered at ~20°2θ from the silica shells and a less intense broadened reflection at ~44°2θ attributed the FeCo nanoparticles main reflection (the [110] reflection). X-ray photoelectron spectroscopy (XPS) spectra were collected using a PHI Versaprobe II (after Ar$^+$ ion sputtering to remove any possible surface contamination) on the three core/shell nanoparticle samples at the binding energies associated with the Fe2p, Co2p, Si2p, C1s, and O1s transitions. After correcting the spectra for charge effects using the 285 eV C1s peak, the Fe2p and Co2p XPS spectra were described using individual Gaussian-Lorentzians with constrained widths and shapes, and an iterated Shirley background function. Metallic Fe and Co 2p$^{3/2}$ peaks (see FIGS. 4,B-D) centered at ~707 eV and 778 eV, respectively, were observed for all three samples. Peaks at higher binding energies resulting from the 2+ and 3+ oxidation states of Fe and Co were observed, indicating the presence of both Fe and Co silicates. Effects of the proximity to Fe and Co ions at the interface between core and shell on the Si2p peak were observed by way of silica and metallic silicate spectral features required to describe correctly the Si2p peak spectral features. Fe- and Co-silicates formed at the interface between the FeCo nanoparticle core and the SiO$_2$ shell during the synthesis process. Further evidence was provided by way of comparison between the relative integrated areas of the Fe$^0$ and Co$^0$ metallic peaks of the different core/shell nanoparticle systems that indicated Fe-silicates formed preferentially over Co-silicates.

To examine the effect the metal silicate interface formed during SiO$_2$ shell synthesis had on the magnetism, the temperature dependence of the DC susceptibility, $\chi_{DC}(T) = M(T)/\mu_0 H$, for the FeCo/SiO$_2$ nanoparticle samples was measured using a Quantum Design (QD) superconducting quantum interference device (SQUID) magnetometer in both the zero-field-cooled (ZFC) and field-cooled (FC) configurations using an applied field of 5 mT, shown in FIG. 5. Initially, the samples were ZFC from 400 to 2 K, well above their superparamgnetic blocking temperature (T$_B$) to ensure that the nanoparticles' magnetizations were oriented randomly along their easy axis (set by the intrinsic magnetocrystalline anisotropy) so that no preferred orientation was set. As thermal energy was added to the system with warming from 2 K, a rapid increase in the overall susceptibility (their magnetizations underwent 180° orientation flips with respect to their intrinsic magnetocrystalline anisotropy axis; faster than the timescale of the measurement) and observed as a maximum in $\chi_{ZFC}(T)$. With further addition of thermal energy with warming, the remaining larger nanoparticles became superparamagnetic and a decrease in the measured magnetization was observed as the (time-averaged) measured susceptibility decreased. In general, for a non-interacting monodisperse single-domain nanoparticle T$_B$ is indicated by maximum in the $\chi_{ZFC}(T)$ that coincides with the divergence with $\chi_{FC}(T)$. Since the TEM images indicated a reasonably monodisperse system, with all FeCo nanoparticles in their SiO$_2$ shells having similar small size distributions, the observed differences in the $\chi_{ZFC}(T)$ and $\chi_{FC}(T)$ around a temperature which should nominally be a T$_B$ must be due to dipole-dipole interactions occurring between the nanoparticles. The maximum $\chi_{ZFC}(T)$ and $\chi_{FC}(T)$ temperature (T$_P$), is representative of the temperature where the dipole-dipole interaction energies are on par with that provided by the applied field to reorient the nanoparticle's magnetization at that temperature. The T$_B$'s for the nanoparticle samples were determined to be ~30 K, ~30 K, and ~43 K from the peaks in the $\chi_{ZFC}(T)$ for the FeCo/SiO$_2$(3 nm), FeCo/SiO$_2$(4 nm), and FeCo/SiO$_2$(6 nm) samples, respectively. These T$_B$'s were in good agreement with those determined from the temperature dependence of the coercivity.

To determine the effects of the interfacial metal silicate layer on the overall magnetocrystalline anisotropy of the core/shell nanoparticles, frequency dependent AC susceptibility measurements ($\chi_{AC}(T,\nu)$) using a 0.25 mT drive field at frequencies from 10 to 1000 Hz were performed (see FIG. 6). For example, the FeCo/SiO$_2$(3 nm) nanoparticle system, after ZFC down to 10 K, presented a gradual increase in $\chi_{AC}(T)$ with warming, from the increased thermal energy which enabled the single domain FeCo/SiO$_2$(3 nm) nanoparticle's magnetizations to oscillate with increasing rates. At T$_B$=30 K (obtained from the frequency dependent peak of the in-phase and out-of-phase component of the $\chi_{AC}(T)$), the nanoparticle's magnetizations started to become superparamagnetic, undergoing 180° orientation flips. As the occurrence of these superparamagnetic fluctuations increased, with continued warming, the time-averaged nanoparticle magnetization decreased, resulting in the gradual reduction in $\chi_{AC}(T)$ along with no observable frequency independence as the fluctuations occurred beyond the measuring time window. For the FeCo/SiO$_2$(4 nm) and FeCo/SiO$_2$(6 nm) nanoparticle samples, similar trends in the temperature and frequency dependence of $\chi_{AC}(T,\nu)$ were observed and T$_B$'s of 30 and 43 K were determined. Describing the observed frequency dependence of T$_B$ from the in-phase $\chi'_{AC}(T,\nu)$ using the Vogel-Fulcher law enabled the nanoparticles overall magnetocrystalline anisotropies to be calculated. A value of $(6\pm1)\times10^5$ J/m$^3$, $(5\pm1)\times10^5$ J/m$^3$, and $(12\pm2)\times10^5$ J/m$^3$ were obtained for the FeCo/SiO$_2$(3 nm), FeCo/SiO$_2$(4 nm), and FeCo/SiO$_2$(6 nm) samples, respectively. As the thickness of the silica shells increased the overall magnetocrystalline anisotropy increased as well, indicating that the metal silicate interface layer affected significantly the surface spin environment of the FeCo core.

Hysteresis loops (inset of FIG. 6) were collected after the samples were initially FC in 5 T from 300 K (a temperature above T$_B$) to 5 K. Field-cooling was done to establish whether even a monolayer of a Fe- or Co-oxide had formed around the FeCo nanoparticle core's that would result in a field shift from zero of the hysteresis loops—none was observed, indicating clearly that any oxidation had not occurred. Interesting, the hysteresis loops of all three FeCo/silica core/shell systems had a paramagnetic component at high fields, likely from the complex metal silicates. Above the saturating field, all of the nanoparticle's magnetic moments aligned with the applied field, reaching saturation, thus any measured susceptibility reflected only the non-ferromagnetic contributions (e.g. paramagnetic and diamagnetic). With an increased thickness of the silica shell, a decrease in the high field susceptibility was observed as the overall contribution from the diamagnetic silica increased relative to the paramagnetic contribution from the complex metal silicates (the silica shell accounted for a large percentage of the overall mass, >80%, and volume, >90%, of the nanoparticle sample). The temperature dependence of the measured coercivities normalized to the respective blocking temperatures to account for the different (temperature) energy-scales due to the intrinsic differences in magnetocrystalline anisotropies described above, $H_C(T/T_B)$, shown in FIG. 6, were observed to decrease rapidly as the temperature was increased with $H_C(T=T_B)=0$ in good agreement with both susceptibility measurements ($\chi_{AC}$, and $\chi_{DC}$). It was observed that as the thickness of the silica shell was increased from 3 to 6 nm, the measured $H_C$ also increased, likely as a result of the increased magnetic volume of the core as more interface Fe and Co atomic spins in the FeCo nanoparticles were recaptured to provide additional magnetic response. A similar increase was observed in the saturation magnetization measured at 5 K, where $M_S$=54.6±0.9 emu/g, 56.8±0.1 emu/g, and 65.8±0.2 emu/g for FeCo/SiO$_2$(3 nm), FeCo/SiO$_2$(4 nm), and FeCo/SiO$_2$(6 nm), respectively.

The invention claimed is:

1. A superparamagnetic core shell nanoparticle, comprising:
   a superparamagnetic core comprising an iron cobalt alloy;
   a shell of a silicon dioxide coating the core; and
   a metal silicate interface layer between the core and the silicon dioxide shell;
   wherein
   a diameter of the iron cobalt alloy core is 200 nm or less,
   the core shell particle is obtained by a process comprising:
   wet chemical precipitation of the core;
   coating of the core with a wet chemical silicate synthesis to form the silicon dioxide shell, and
   the thickness of the metal silicate interface is controlled by the time of the wet chemical synthesis.

2. The superparamagnetic core shell nanoparticle according to claim 1, wherein the metal silicate of the interface layer comprises at least one of iron silicate and cobalt silicate.

3. The superparamagnetic core shell nanoparticle according to claim 1, wherein the thickness of the metal silicate interface layer is from 0.5 nm to 15 nm.

4. The superparamagnetic core shell nanoparticle according to claim 1, wherein the superparamagnetic core consists of an iron cobalt alloy.

5. The superparamagnetic core shell nanoparticle according to claim 1, wherein the diameter of the iron cobalt core is from 2 to 75 nm.

6. A magnetic core, comprising:
   a plurality of the superparamagnetic core shell nanoparticles according to claim 1;
   wherein
   the magnetic core is a monolithic structure of superparamagnetic core grains of an iron cobalt alloy directly bonded by the silicon dioxide shells, which form a silica matrix, and
   a layer comprising at least one of iron silicate and cobalt silicate interfaces the core to the matrix.

7. The magnetic core according to claim 6, wherein a space between individual superparamagnetic iron cobalt alloy nanoparticles is occupied substantially only by the silicon dioxide and the at least one of iron silicate and cobalt silicate.

8. The magnetic core according to claim 7, wherein the superparamagnetic core consists of an iron cobalt alloy.

9. The magnetic core according to claim 7, wherein at least 97% by volume of the space between the superparamagnetic core grains of iron cobalt alloy is occupied by silicon dioxide and the at least one of iron silicate and cobalt silicate.

10. The magnetic core according to claim 7, wherein an average grain size of the superparamagnetic core grains of iron cobalt alloy is from 2 to 160 nm.

11. A method to prepare a monolithic magnetic core,
    the magnetic core comprising superparamagnetic core shell particles having a particle size of less than 200 nm;
    the method comprising sintering the superparamagnetic core shell nanoparticles of claim 1 under heat and pressure and under flow of an inert gas to obtain a monolithic structure;
    wherein the core comprises a superparamagnetic iron cobalt alloy nanoparticle in a matrix of a silicon dioxide matrix and an interface layer between the core and the shell comprises at least one of iron silicate and cobalt silicate.

12. The method according to claim 11, further comprising heating the core shell nanoparticles at a temperature of from 125° C. to 600° C. for from 3 to 7200 seconds before the sintering under heat and pressure.

13. An electrical/magnetic conversion device, which comprises a magnetic core according to claim 6.

14. An electrical/magnetic conversion device, which comprises a magnetic core according to claim 7.

15. A vehicle part comprising the electrical/magnetic conversion device according to claim 13, wherein the part is selected from the group consisting of a motor, a generator, a transformer, an inductor and an alternator.

16. A vehicle part comprising the electrical/magnetic conversion device according to claim 14, wherein the part is selected from the group consisting of a motor, a generator, a transformer, an inductor and an alternator.

* * * * *